(12) United States Patent
Falk et al.

(10) Patent No.: US 7,810,246 B2
(45) Date of Patent: Oct. 12, 2010

(54) BOLT AS-BUILTER SURVEY CONE

(75) Inventors: Michael Owen Falk, Portage, IN (US); Kenneth Wayne Ferguson, Portage, IN (US); Mark Alan Deardorff, San Pierre, IN (US); Bruce David Ward, LaPorte, IN (US)

(73) Assignee: Falk PLI Engineering and Surveying, Inc., Portage, IN (US)

( * ) Notice: Subject to any disclaimer, the term of this patent is extended or adjusted under 35 U.S.C. 154(b) by 139 days.

(21) Appl. No.: 12/229,921

(22) Filed: Aug. 28, 2008

(65) Prior Publication Data
US 2010/0050448 A1  Mar. 4, 2010

(51) Int. Cl.
G01C 15/02 (2006.01)
G01C 15/06 (2006.01)

(52) U.S. Cl. ............... 33/299; 33/293; 33/613; 33/645

(58) Field of Classification Search .......... 33/293, 33/295, 296, 299, 613, 624, 625, 644, 645, 33/520; 116/209, 63 C; 52/103, 104; 248/357
See application file for complete search history.

(56) References Cited

U.S. PATENT DOCUMENTS

| | | | | |
|---|---|---|---|---|
| RE13,656 E | * | 12/1913 | Randolph | 52/103 |
| 2,263,138 A | * | 11/1941 | Olson | 52/298 |
| 3,645,487 A | * | 2/1972 | Gilchrist | 248/200.1 |
| 4,198,865 A | | 4/1980 | Tarpley, Jr. et al. | |
| 4,469,302 A | * | 9/1984 | Stoudt | 248/512 |
| 4,527,339 A | * | 7/1985 | Brunson | 33/293 |
| 4,765,277 A | * | 8/1988 | Bailey et al. | 119/57.9 |
| 4,803,784 A | * | 2/1989 | Miller | 33/293 |
| 4,879,816 A | * | 11/1989 | Sierk | 33/295 |
| 5,446,968 A | * | 9/1995 | Okaniwa et al. | 33/295 |
| 5,566,460 A | | 10/1996 | Bates | |
| 5,798,981 A | | 8/1998 | Littlejohn et al. | |
| 5,878,505 A | * | 3/1999 | Scarpellini | 33/666 |
| 5,943,784 A | * | 8/1999 | Hiramine | 33/293 |
| 6,055,735 A | | 5/2000 | Weihrauch et al. | |
| 6,067,046 A | | 5/2000 | Nichols | |
| 6,425,186 B1 | | 7/2002 | Oliver | |
| 6,427,356 B1 | | 8/2002 | Schamal | |

(Continued)

FOREIGN PATENT DOCUMENTS

GB    2433534 A  *  6/2007

(Continued)

OTHER PUBLICATIONS

Prisms & Prism/Range Poles by Kara Company, Inc. printed from www.karaco.com on Dec. 2, 2007.

(Continued)

Primary Examiner—R. A. Smith
(74) Attorney, Agent, or Firm—Stradley Ronon Stevens & Young, LLP

(57) ABSTRACT

Survey tool for performing as-built survey measurements with improved accuracy by engaging with and centering on stationary fasteners. The survey tool has a substantially conical receiver with a narrow end and a wide end, the wide end adapted for centering on stationary fasteners of various sizes. A connector is coupled to the narrow end of the conical receiver and is adapted for engaging a rod.

20 Claims, 4 Drawing Sheets

U.S. PATENT DOCUMENTS

| | | |
|---|---|---|
| 6,633,256 B2 | 10/2003 | Zhdanov et al. |
| 6,659,409 B2 | 12/2003 | Ashjaee |
| 6,668,012 B1 | 12/2003 | Hershey et al. |
| 6,772,526 B1 | 8/2004 | Crain et al. |
| 6,874,239 B1 | 4/2005 | White |
| 7,024,938 B2 | 4/2006 | Gleman et al. |
| 7,043,364 B2 | 5/2006 | Scherzinger |
| 7,064,819 B2 | 6/2006 | Detweiler et al. |
| 7,257,903 B2 * | 8/2007 | Lee .............................. 33/293 |
| 7,636,963 B1 * | 12/2009 | Cretsinger et al. ............. 5/247 |
| 7,669,341 B1 * | 3/2010 | Carazo ........................ 33/293 |
| 2003/0121231 A1 * | 7/2003 | Hinds ........................ 52/677 |

FOREIGN PATENT DOCUMENTS

| | | | |
|---|---|---|---|
| JP | 02213559 A | * | 8/1990 |
| JP | 03223618 A | * | 10/1991 |
| JP | 09013398 A | * | 1/1997 |

OTHER PUBLICATIONS

Surveying, Safety & Construction Products by SECO Mfg. Co., Inc. of Redding, CA, printed from www.surveying.com on Oct. 23, 2007.

* cited by examiner

BOLT AS-BUILTER SURVEY CONE

FIELD OF THE INVENTION

The present invention is related to survey equipment and, more particularly, to survey equipment for use with substructure as-built bolts.

BACKGROUND OF THE INVENTION

As-built surveys capture detailed configurations of completed construction projects or project phases. As-built surveys of completed substructures are used to accurately show the as-built versus the plan location of all substructure centerlines, girder centerlines, centerlines of anchor bolt groups, anchor bolts, bearing elevations, and any other elements or items that may affect the layout or placement of the superstructure. One problem that these surveys try to address is the possibility of non-conformities with original plans.

It is desirable to have survey equipment that is lightweight, sturdy, accurate, and simple to use. Further, interoperability among survey tool components is preferable so that a surveyor need only carry a single set of tools in the field. Still further, it is often desirable for survey tools to function in a variety of field surface conditions. To achieve this particular goal, survey poles are traditionally footed with a steel point to locate the pole on a surface. Sometimes the traditional steel pole is replaced with a T-shaped steel footer to increase the area of contact between the footer and the surface in order to avoid the footer deforming or penetrating the surface.

Dimensional accuracy is also desirable so that correct measurements in a survey can be obtained. With many surface conditions, the survey pole is placed on a tip of a sharp steel point footer and the steel point footer is placed on a head of an anchor bolt. With an as-built survey, the survey pole may be placed at the center of the head of the anchor bolt. Upon placement of the survey pole, dimensional measurements are recorded. Using this approach, there is often difficulty both in locating the center of the anchor bolt and in maintaining the steel point footer at the center of the anchor bolt while performing measurements. As a result, accuracy may not be ideal. Therefore, it is an object of the present invention to provide survey equipment able to make more accurate measurements.

SUMMARY OF THE INVENTION

To achieve this and other objects, in one of its aspects the present invention provides a survey tool comprising a substantially conical receiver having a narrow end and a wide end. The wide end is adapted for centering on a stationary fastener. A connector is coupled to the narrow end of the conical receiver and is adapted to engage a rod.

In another aspect, the present invention provides a survey tool comprising a substantially conical receiver, having a narrow end and a wide end, adapted for centering on a stationary fastener. A connector is coupled to the narrow end of the conical receiver. A rod is provided having at least one end axially connected to the connector. A level is connected to the rod.

In yet another aspect, the present invention provides a survey tool comprising a longitudinal axis. A substantially conical receiver has a surface extending at a substantially constant slope with respect to the longitudinal axis. The conical receiver has a narrow end and a wide end adapted for centering on a stationary fastener. A connector has a proximal end, a female threaded receptacle, and a distal end. A substantially cylindrical rod has a first end and a second end, where the first end has a male threaded shaft that is detachably connected to the female threaded connector receptacle. A level is connected to the rod.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
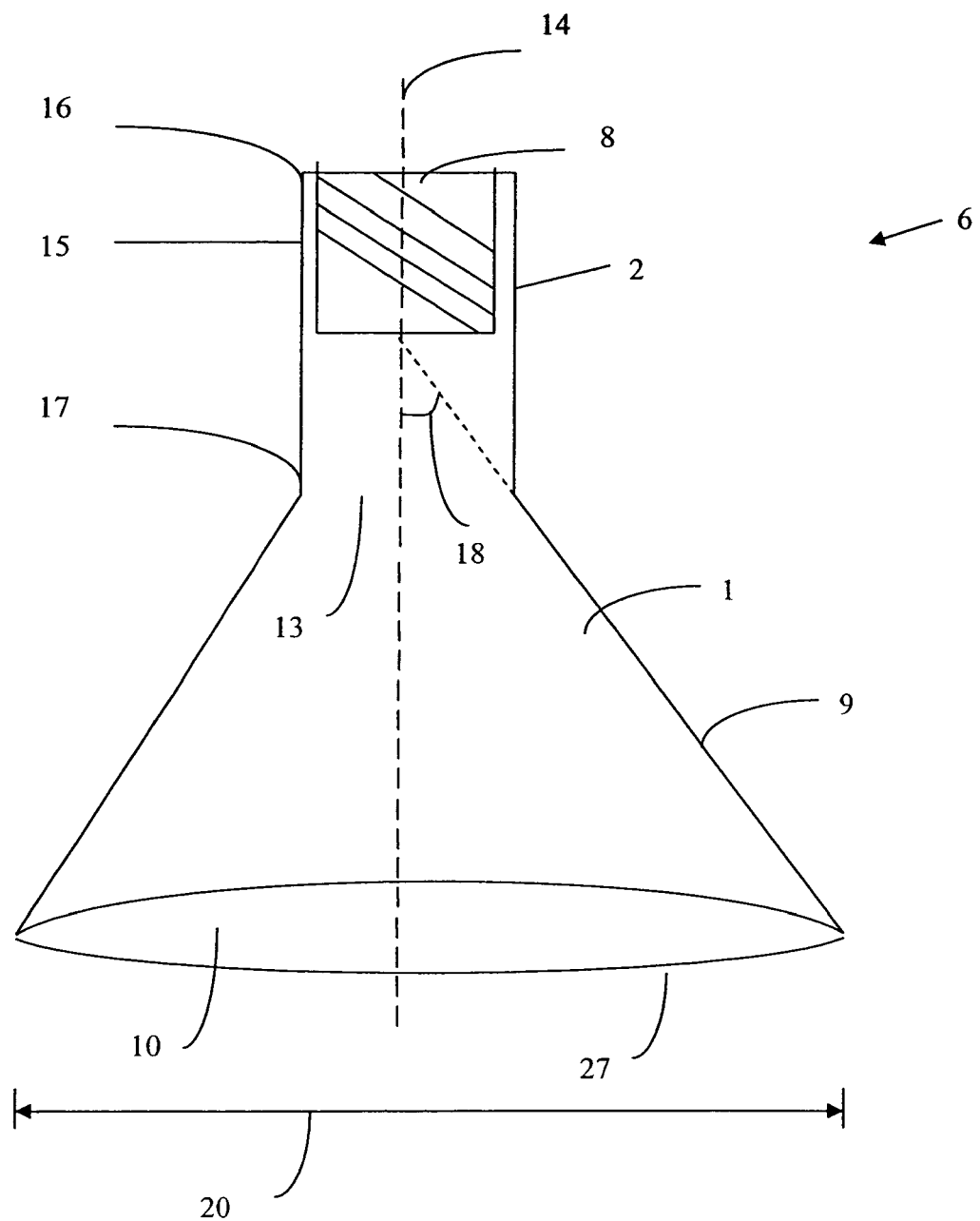
FIG. 1 is a sectional view of a survey tool in accordance with the present invention.

Referring now to the drawing, in which like reference numbers refer to like elements throughout the various figures that comprise the drawing, FIG. 1 shows a survey tool 6 having a conical receiver 1 coupled to a connector 2 that receives a survey pole or other similar device (e.g., a prism pole, rod, or stick). The conical receiver 1 may be made integral with the connector 2. By "integral" is meant a single piece or a single unitary part that is complete by itself without additional pieces, i.e., the part is of one monolithic piece formed as a unit with another part. The conical receiver 1 and the connector 2 lie along a common longitudinal axis 14.

The conical receiver 1 has a surface 9, which has a substantially constant slope and forms a substantially conical aperture 10. The surface 9 is sloped from a narrow end 13 to a wide end 27 such that an angle 18 between the longitudinal axis 14 and the surface 9 is, preferably, less than 90 degrees; more preferably, less than 45 degrees; and most preferably, about 30 degrees. Any angle forming a substantially conical aperture may be formed, however, without departing from the scope of the present invention.

In one embodiment, the wide end 27 is substantially circular and has an outside diameter 20. The wide end 27 may be any other shape, however, such as square, rectangular, triangular, hexagonal, ovular, or any other geometric shape, as long as it is wider than the narrow end 13 and fits over a designated fastener. In one example, the conical receiver 1 has a circular wide end 27 with an outside diameter 20 of about 5.7 cm (2.25 inches). Given an exemplary wall thickness for the conical receiver 1 of about 0.3 cm (⅛ inches), the inside diameter of the circular wide end 27 is about 5.1 cm (2 inches). The diameter of the narrow end 13 is about 1.9 cm (0.75 inches). The height of the conical receiver 1 is about 4.76 cm (1.875 inches) as measured from the narrow end 13, where the conical receiver 1 joins the connector 2, to the wide end 27. The exemplary angle 18 is about 30 degrees. Thus, the conical receiver 1 may be frustoconical in shape.

The conical receiver 1 may be made of a metal or a sturdy non-metal. Metals such as stainless steel are suitable. Suitable non-metals include a durable plastic or any other rigid material capable of being formed into the required shape.

The connector 2 is typically a cylindrical component that comprises an outer wall 15, a second end 17 coupled with the narrow end 13 of the conical receiver 1, and a first end 16 with a threaded receptacle 8. In one embodiment, the threaded receptacle 8 is a female threaded receptacle adapted to detachably couple with a male threaded shaft on a rod, survey pole, or other similar device. In another embodiment, the threaded receptacle 8 is a male threaded shaft, or other mating device (e.g., a snap lock device), capable of securely coupling the connector 2 to the rod. In one example, the threaded receptacle 8 has ⅝ inch standard thread that extends about 1.27 cm (0.5 inches) down from the first end 16 of the connector 2 (i.e., the thread depth is about 1.27 cm). Exemplary dimensions for the connector 2 are a height of about 2.86 cm (1.125 inches) and a diameter of about 1.9 cm (0.75 inches). Although all dimensions of the connector 2 may be varied depending upon the particular application, it is envisioned that the height of the connector 2 may especially be varied.

Figure 2:
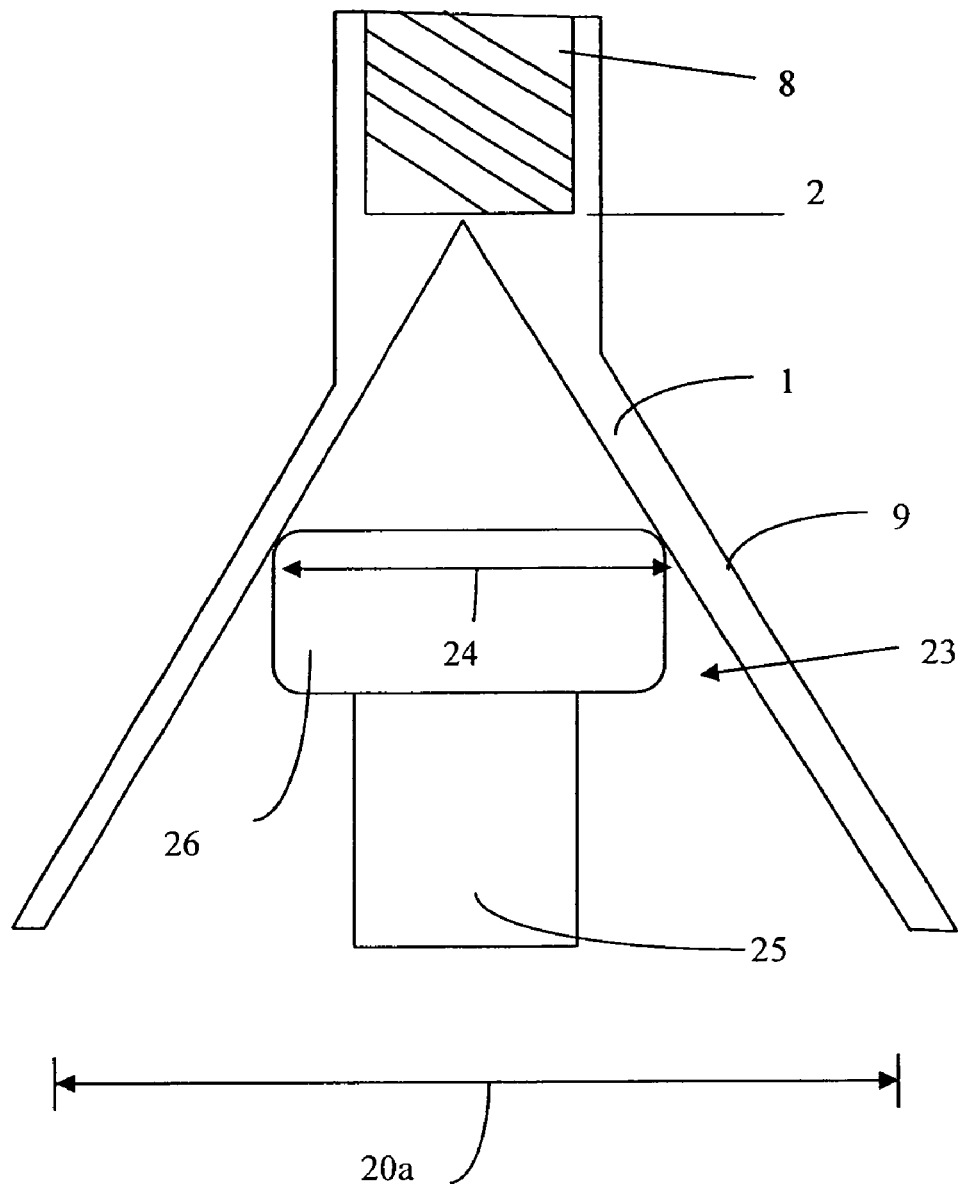
FIG. 2 is a sectional view of the survey tool of FIG. 1 on a stationary fastener.

The conical receiver 1 engages with and centers on a stationary fastener 23, as shown in the sectional view of FIG. 2. The conical receiver 1 is adapted to engage and center on a plurality of stationary fastener sizes. The stationary fastener 23 may be a bolt, such as an anchor bolt, or any other type of bolt or fastener (e.g., screw, rivet, and the like). In one embodiment, the stationary fastener 23 has a shaft 25 and a head 26, where the shaft 25 is attached to a surface or object and the head 26 may be contacted by the conical receiver 1. The inside diameter 20*a* of the wide end 27 is greater than a diameter 24 of the head 26 of the stationary fastener 23 so that the conical receiver 1 fits over the stationary fastener 23. In one embodiment, the conical receiver 1 encloses and centers on the stationary fastener 23, where the diameter 24 is less than the diameter 20*a*. In another embodiment, the conical receiver 1 contacts the stationary fastener 23, having a diameter 24 larger than the diameter 20*a*, such that the conical receiver 1 sits on the stationary fastener 23. In yet another embodiment, the conical receiver 1 contacts the ground or any other substantially flat surface.

The length of the surface 9 and the angle 18 that define the slope of the conical receiver 1 are predetermined to accommodate the size, including the diameter 24, of the stationary fastener 23. By "predetermined" is meant determined beforehand, so that the predetermined dimensions must be determined, i.e., chosen or at least known, before the survey tool 6 is chosen for use in connection with the stationary fastener 23. The diameter 24 of the stationary fastener 23 typically ranges from approximately 1.25 to 8 cm. In one embodiment, the diameter 24 is approximately 2.5 to 8 cm. In another embodiment, the diameter 24 is approximately 1.25 to 6.5 cm. The conical receiver 1 may be formed in a plurality of sizes by varying one or both of the length of surface 9 and the angle 18 of the slope. A plurality of sizes of the conical receiver 1 are envisioned to enable the conical receiver 1 to engage stationary fasteners 23 of various dimensions.

Figure 3:
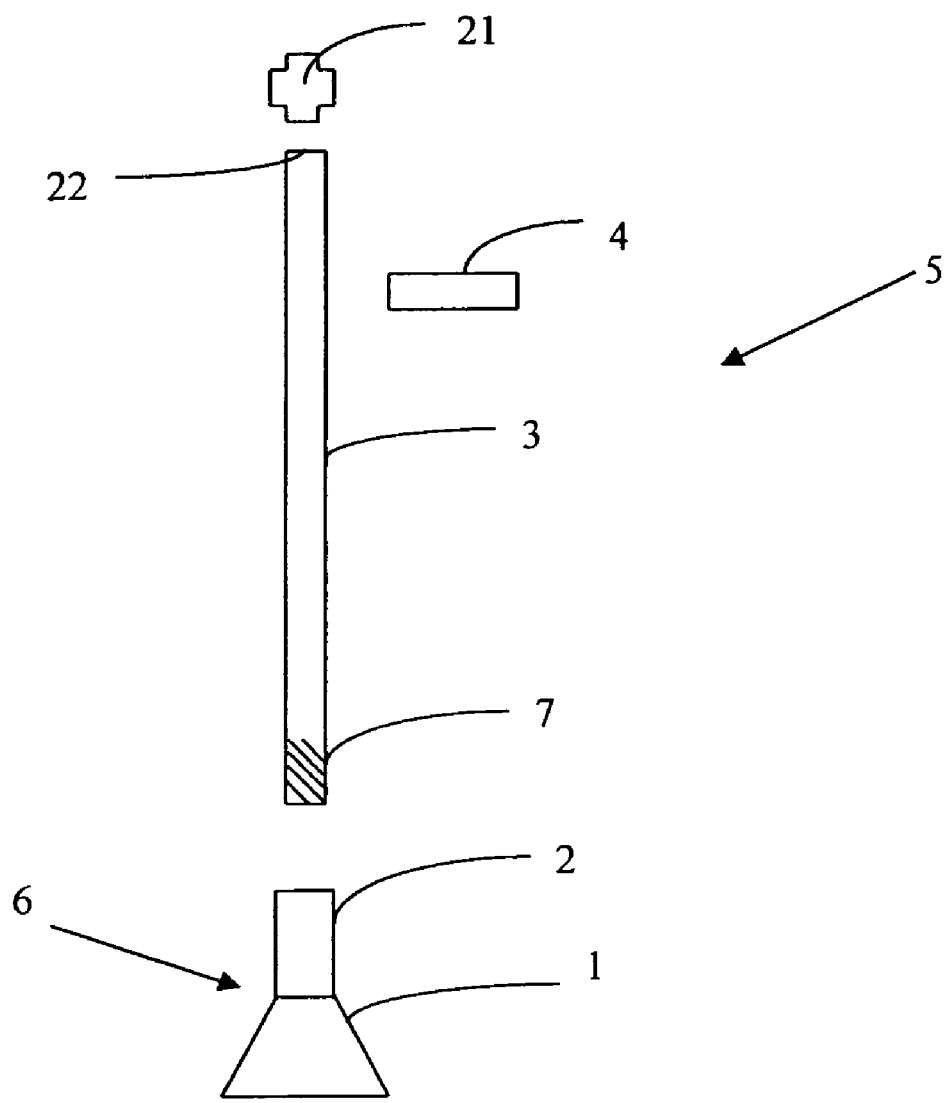
FIG. 3 is an exploded view of a survey pole.
Figure 4:
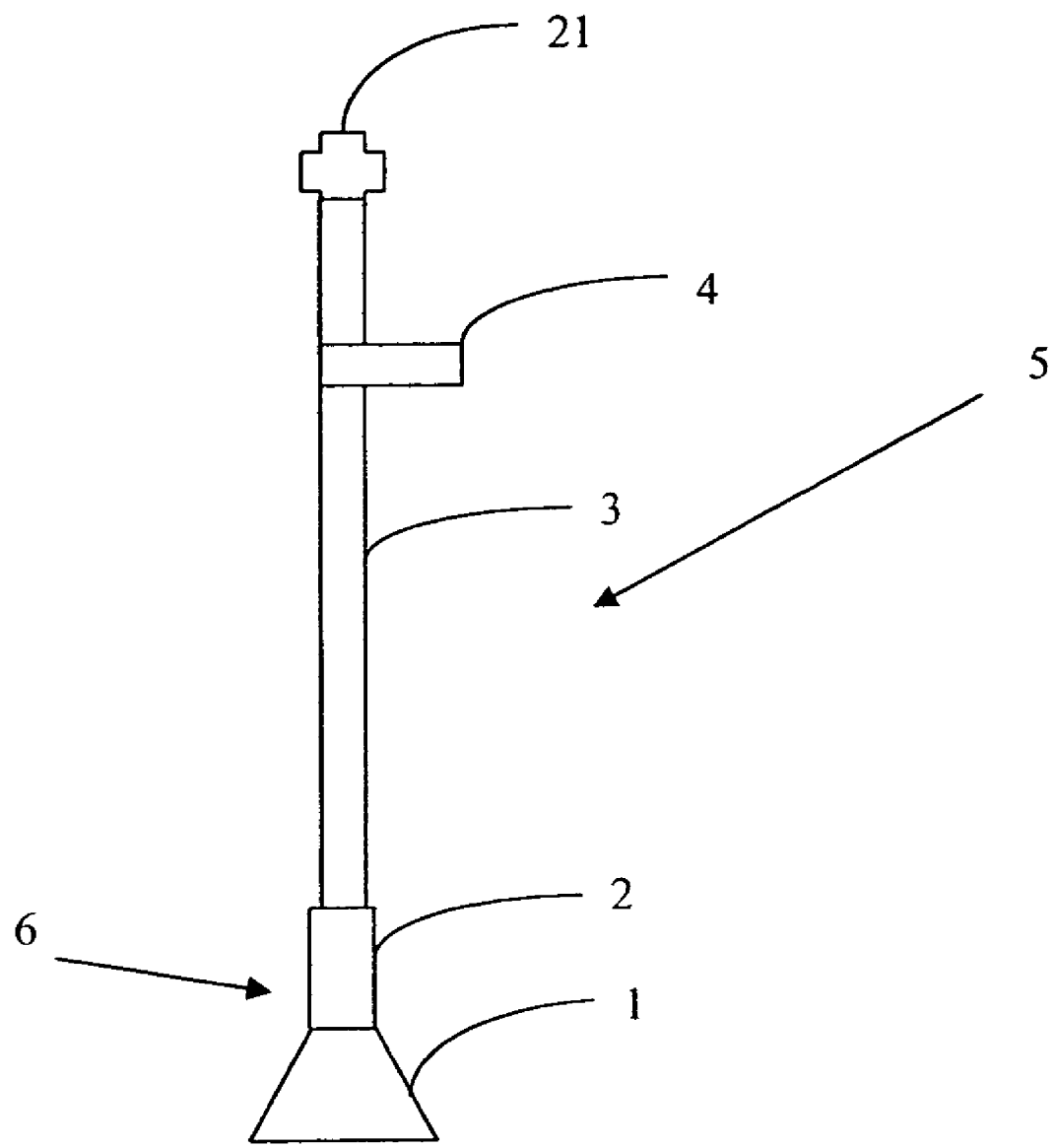
FIG. 4 is a side view of the survey pole.

FIGS. 3 and 4 show an exemplary survey pole 5 according to an embodiment of the present invention. The survey tool 6 is illustrated as having the connector 2 and the conical receiver 1. The survey pole 5 includes a rod 3 having a threaded shaft 7 at one end that fits with and engages the threaded receptacle 8 of the connector 2. The rod 3 is preferably cylindrical. In a preferred embodiment, the rod 3 is detachably coupled axially with the survey tool 6. Preferably, a level 4 is coupled with the rod 3 and is used to maintain the survey pole 5 in a plumb position while measurements are performed. The level 4 may be read to plumb the survey pole 5, improving centering accuracy. In one embodiment, a fitting mount 21 is coupled with the rod 3 at an end 22 opposite the threaded shaft 7 for mounting the level 4 or one of a variety of other surveying devices (not shown). Such other surveying devices may include, for example, a prism, a laser, or a Global Positioning System (or GPS) device.

For surveying, the survey pole 5 is positioned such that the conical receiver 1 engages with the stationary fastener 23. Once the survey pole 5 is centered on the stationary fastener 23, accurate survey measurements may be taken and, if desired, recorded.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

What is claimed:

1. A survey tool comprising:
   a substantially conical receiver having a narrow end and a wide end, the wide end adapted for engaging and centering on a plurality of stationary fastener sizes, and a surface extending at a substantially constant slope from the narrow end to the wide end; and
   a connector coupled to the narrow end of the conical receiver, the connector adapted for engaging a rod.

2. The survey tool of claim 1 wherein the connector has a threaded receptacle adapted for receiving a correspondingly threaded rod.

3. The survey tool of claim 1 wherein the wide end substantially encloses the stationary fastener.

4. The survey tool of claim 1 wherein the conical receiver and the connector are integral.

5. The survey tool of claim 4 wherein the conical receiver and the connector are stainless steel.

6. The survey tool of claim 1 further comprising at least one of a level or a surveying device adapted for connection to the rod.

7. A survey tool comprising:
   a substantially conical receiver having a narrow end and a wide end, the wide end adapted for centering on a stationary fastener, being substantially circular, and having an inside diameter of approximately 5 centimeters; and
   a connector coupled to the narrow end of the conical receiver, the connector adapted for engaging a rod.

8. A survey tool comprising:
   a substantially conical receiver having a narrow end and a wide end, the wide end adapted for centering on a stationary fastener, and a surface defining a slope extending from the narrow end to the wide end, the slope having an angle of about 30 degrees; and
   a connector coupled to the narrow end of the conical receiver, the connector adapted for engaging a rod.

9. A survey tool comprising:
   a substantially conical receiver having a narrow end, a wide end adapted for engaging and centering on a plurality of stationary fastener sizes, and a surface extending at a substantially constant slope from the narrow end to the wide end;
   a connector coupled to the narrow end of the conical receiver;
   a rod having at least one end axially connected to the connector; and
   at least one of a level or a surveying device connected to the rod.

10. The survey tool of claim 9 wherein the rod is connected to the connector through a threaded receptacle in the connector and a correspondingly threaded end of the rod.

11. The survey tool of claim 9 wherein the wide end substantially encloses the stationary fastener.

12. The survey tool of claim 9 wherein the wide end is substantially circular and has an inside diameter of approximately 5 centimeters.

13. The survey tool of claim 9 wherein the conical receiver and the connector are integral.

14. The survey tool of claim 13 wherein the conical receiver and the connector are stainless steel.

15. The survey tool of claim 9 wherein the slope has an angle of about 30 degrees.

16. A survey tool comprising:

a longitudinal axis;

a substantially conical receiver extending along the longitudinal axis and having a a narrow end and a wide end adapted for enclosing and centering on a plurality of stationary fastener sizes, and a surface extending at a substantially constant slope with respect to the longitudinal axis from the narrow end to the wide end;

a connector extending along the longitudinal axis and having a first end and a second end, the first end having a threaded receptacle and the second end integral with the narrow end of the conical receiver;

a rod having a first end and a second end, the first end having a threaded shaft being detachably connected to the threaded receptacle of the connector and extending along the longitudinal axis; and at least one of a level or a surveying device connected to the rod.

17. The survey tool of claim 16 wherein the wide end is substantially circular and has an inside diameter of approximately 5 centimeters.

18. The survey tool of claim 16 wherein the conical receiver and the connector are stainless steel.

19. The survey tool of claim 16 wherein the slope has an angle of about 30 degrees.

20. The survey tool of claim 16 wherein the wide end is substantially circular and has an inside diameter of approximately 5 centimeters, the conical receiver and the connector are stainless steel, and the slope has an angle of about 30 degrees.

* * * * *